(12) United States Patent
Dhuse et al.

(10) Patent No.: US 10,564,852 B2
(45) Date of Patent: Feb. 18, 2020

(54) METHOD AND SYSTEM FOR REDUCING MEMORY DEVICE INPUT/OUTPUT OPERATIONS

(71) Applicant: International Business Machines Corporation, Armonk, NY (US)

(72) Inventors: Greg R. Dhuse, Chicago, IL (US); Ravi V. Khadiwala, Bartlett, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 64 days.

(21) Appl. No.: 15/193,027

(22) Filed: Jun. 25, 2016

(65) Prior Publication Data

US 2017/0371542 A1 Dec. 28, 2017

(51) Int. Cl.
*G06F 3/06* (2006.01)
*G06F 12/06* (2006.01)

(52) U.S. Cl.
CPC .............. *G06F 3/061* (2013.01); *G06F 3/067* (2013.01); *G06F 3/0659* (2013.01); *G06F 12/06* (2013.01); *G06F 2212/1016* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Larry T Mackall
(74) *Attorney, Agent, or Firm* — Garlick & Markison; Timothy W. Markison; Randy W. Lacasse (57) ABSTRACT

A storage unit having interface, memory, in-memory table, and processing module, receives a first encoded data slice (EDS) having the first slice name and stores the first EDS in a first location in the memory and also receives a second EDS having the first slice name and stores the second EDS in a second location in the memory. The storage unit then updates the in-memory table to include a first pointer that specifies the first location in the memory and updates the in-memory table to include a second pointer that specifies the second location in the memory. The storage unit then receives a write finalize command that specifies the first EDS or the second EDS that is to be preserved and updates the in-memory table to preserve the pointer to be preserved based on the write finalize command and delete the other pointer.

14 Claims, 8 Drawing Sheets

(56) References Cited

U.S. PATENT DOCUMENTS

| | | |
|---|---|---|
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbell et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0029731 A1* | 2/2011 | Cilfone ............... G06F 11/1076 711/114 |
| 2014/0122592 A1* | 5/2014 | Houston ............. H04L 67/1095 709/204 |
| 2014/0317053 A1* | 10/2014 | Grube ................. G06F 16/1827 707/609 |
| 2015/0026538 A1* | 1/2015 | Sakai .................. G06F 11/1048 714/764 |
| 2015/0113326 A1* | 4/2015 | Talagala ............. G06F 11/1441 714/24 |
| 2017/0083411 A1* | 3/2017 | Berinde ............. G06F 11/1469 |
| 2017/0192705 A1* | 7/2017 | Grube ................. G06F 11/1076 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

METHOD AND SYSTEM FOR REDUCING MEMORY DEVICE INPUT/OUTPUT OPERATIONS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within data storage systems, the lifespan of memory storage devices is related to the number of memory accesses made to such devices. For example, a given memory storage device will be able to function properly for only a certain number of memory accesses (e.g., write and/or read operation) before suffering degradation in performance or failure. For example, certain memory storage devices that undergo a significant number of memory accesses within short period of time will suffer deleteriously and can have unsuccessful memory accesses if not failure of the memory storage device. Nonetheless, for proper operation in a given application or system, there may be a requirement for a large number of memory accesses to any given memory storage device. The prior art does not provide any adequate means or solution to address such problems while maintaining high levels of performance.

DETAILED DESCRIPTION OF THE INVENTION

Figure 1:
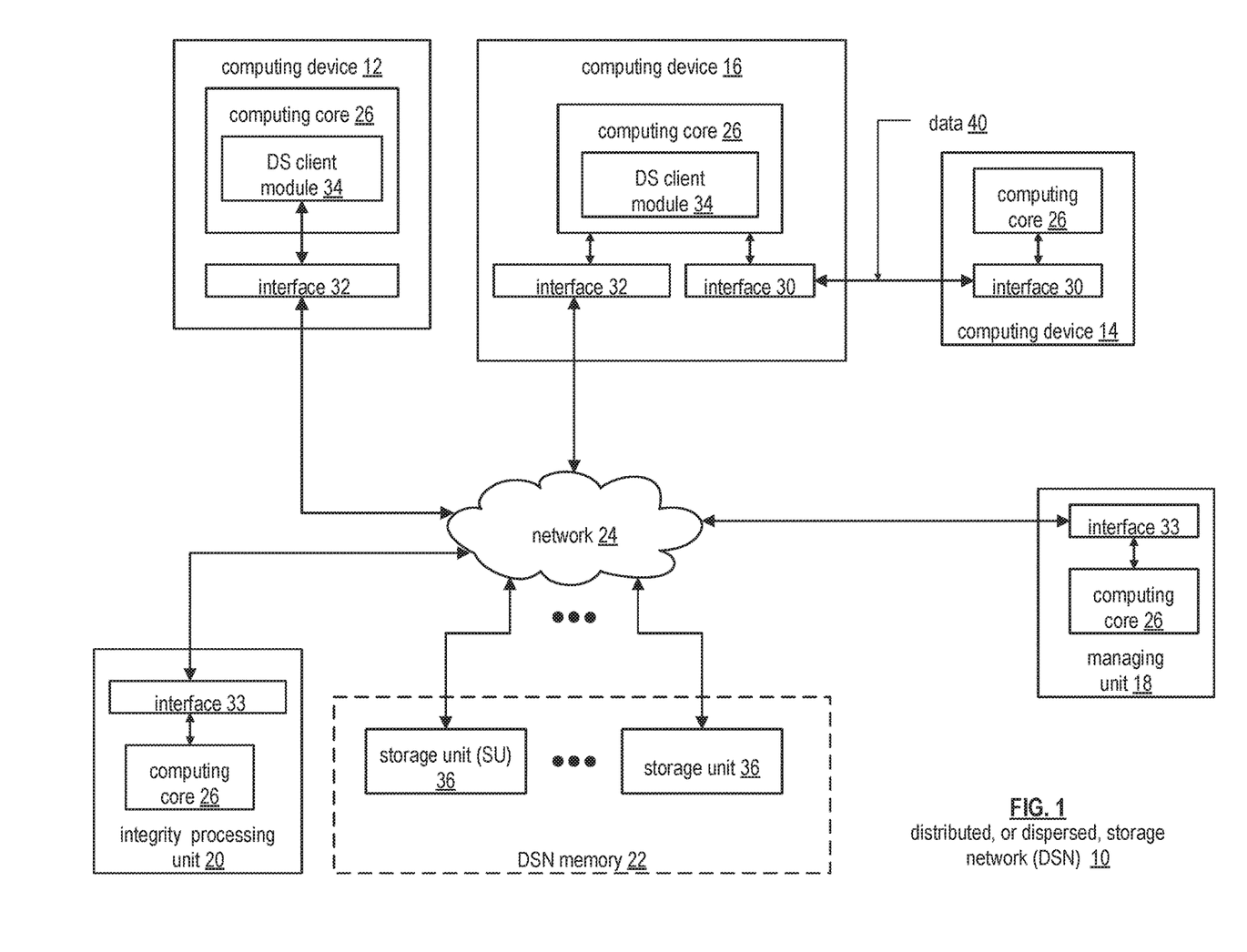
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
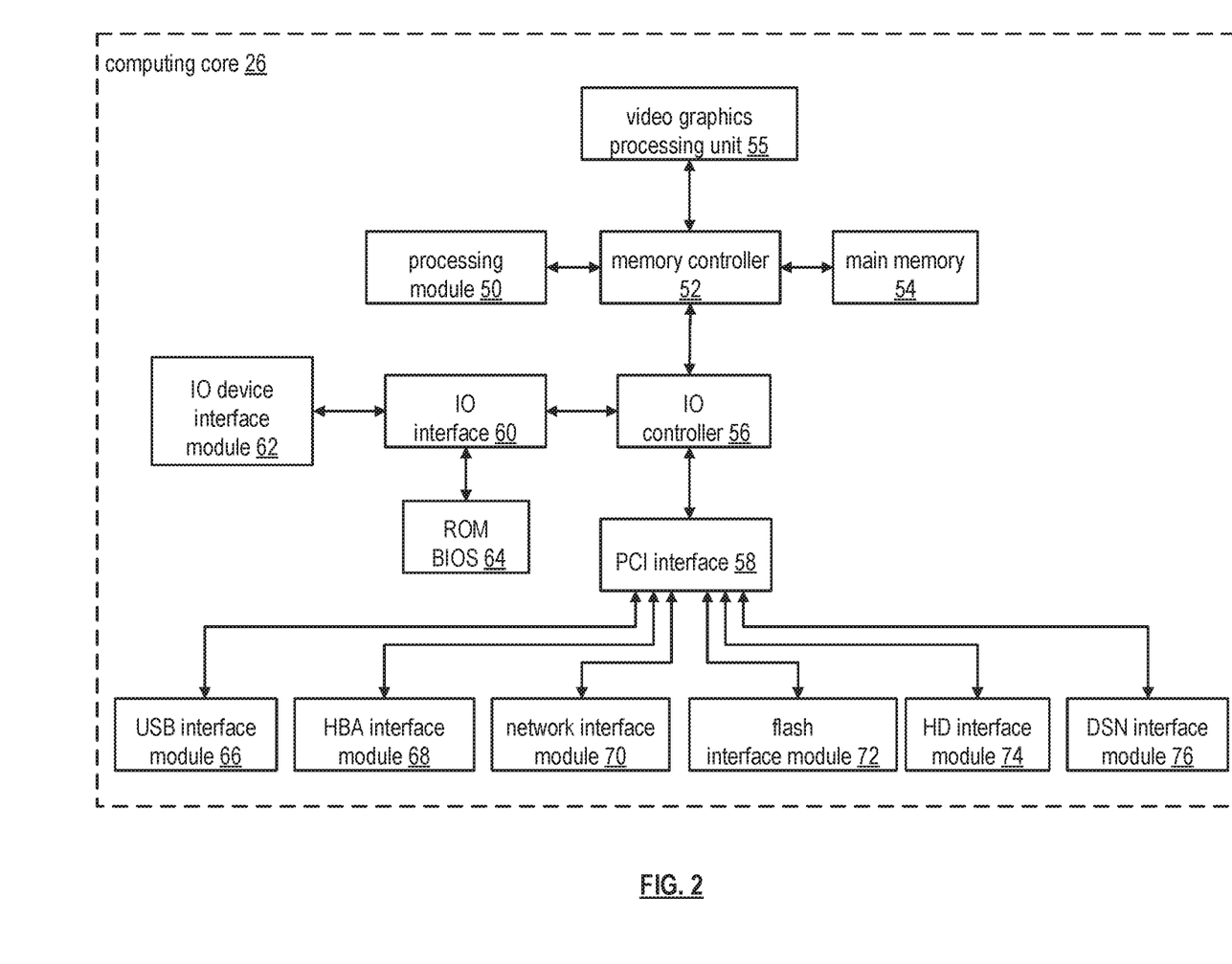
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76 that allows interfacing to other devices, components, storage units, and/or any other desired elements within the DSN.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
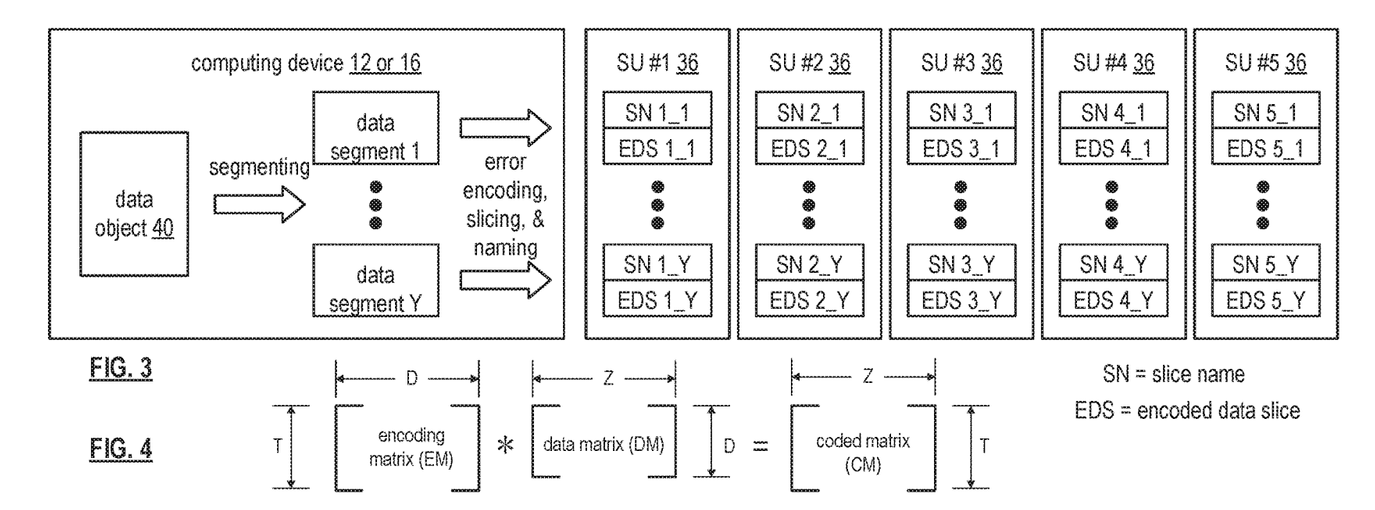
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
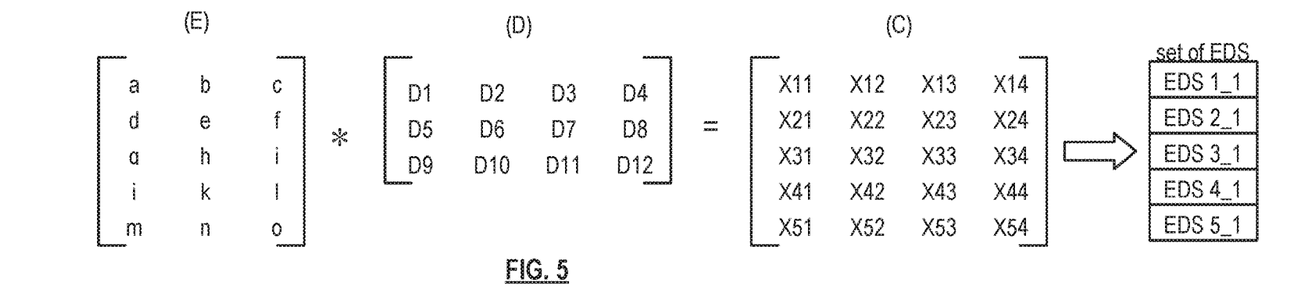
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
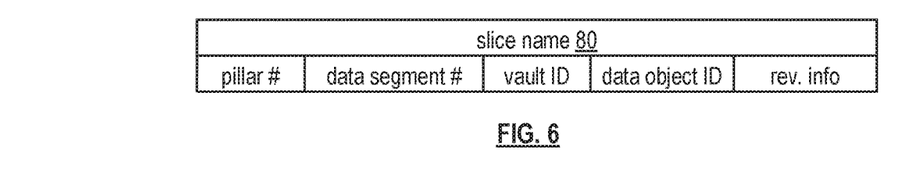
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
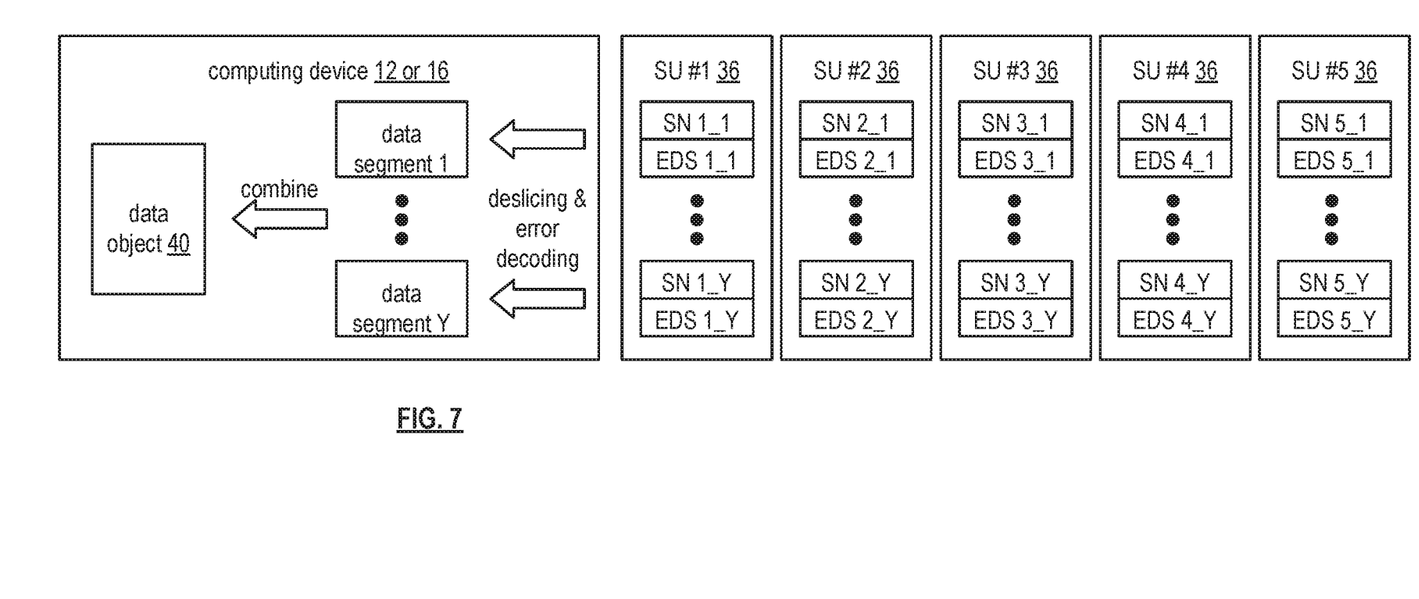
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
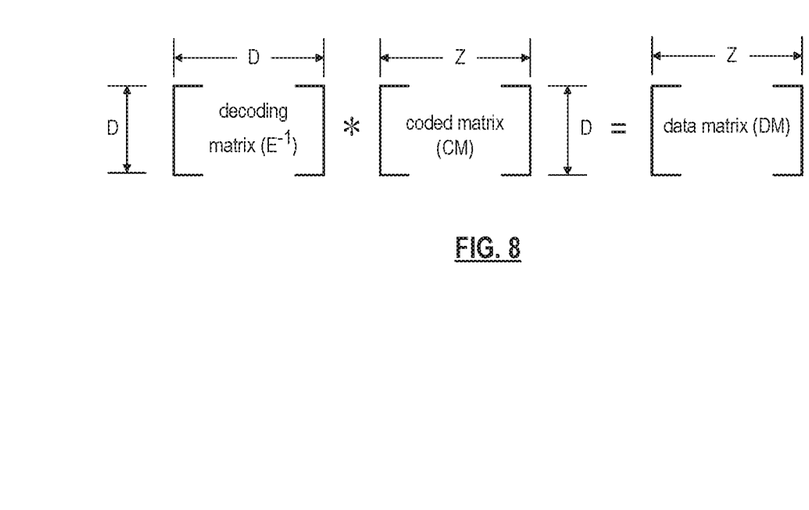
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
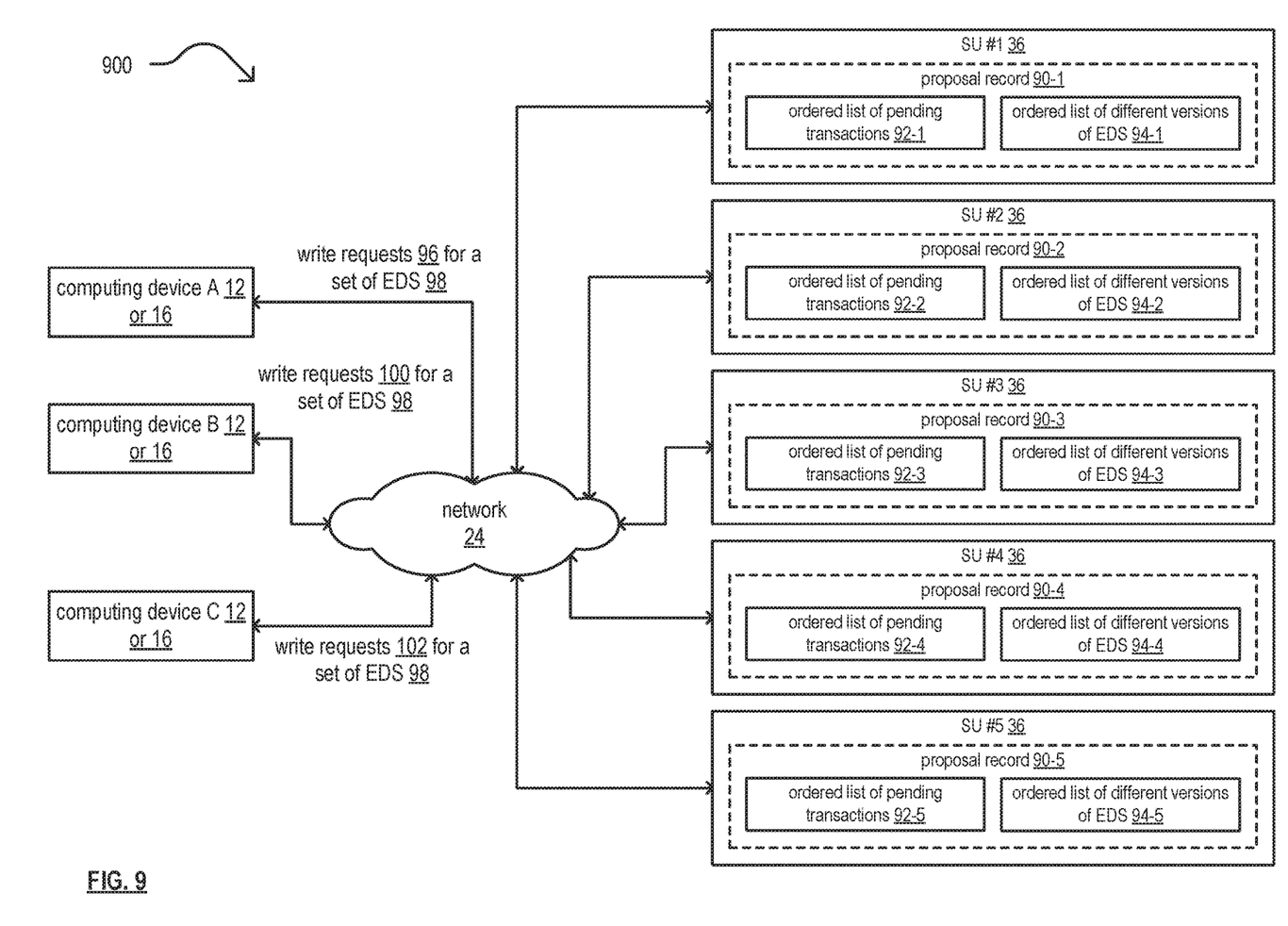
FIG. 9 is a schematic block diagram of an example of overlapping write requests for a set of encoded data slices in accordance with the present invention.

FIG. 9 is a schematic block diagram of an example of overlapping write requests for a set of encoded data slices having the same set of slice names. Overlapping write requests occur when one set of write requests is pending (e.g., write finalize commands have not yet been issued) and another set of write requests for a set of encoded data slices having the same set of slice names is received by the storage units. In this example, computing devices A and B send overlapping write requests regarding a set of encoded data slices with the same set of slices names.

To process overlapping write requests (and other overlapping data access requests), each storage unit 36 (SU#1 SU#5) stores its own proposal record 90-1 through 90-5 for a slice name or for a group of slice names. A proposal record 90 includes an ordered list of pending transactions 92 and an ordered list of visible and different versions of an encoded data slice (EDS) 94 having the same slice name. The proposal record 90 may further include an indication of the current revision level of the encoded data slice.

The ordered list of pending transactions 92 include a time ordered list of transaction numbers, or other indication, associated with data access requests regarding the slice name that were received while the proposal record is open (e.g., write finalize commands have not yet been issued for one of the pending write requests). For example, the proposal record 90-1 of storage unit #1 includes an ordered list of transaction numbers for data access requests regarding a first slice name of a set of slice names.

As a specific example, a first write request from computing device A regarding a version of an encoded data slice having the first slice name has a first transaction number (e.g., 0413) and a second write request from computing device B regarding another version of the encoded data slice having the first slice name has a second transaction number (e.g., 0279). Storage unit #1 received the first write request before receiving the second write request, as such the proposal record 90-1 has the first write request (e.g., the first transaction number) in a first priority position and the second write request in a second priority position.

As another specific example, a write request from computing device A regarding a version of an encoded data slice having a second slice name has the first transaction number (e.g., 0413) and a write request from computing device B regarding another version of the encoded data slice having the second slice name has the second transaction number (e.g., 0279). Storage unit #2 received the write request from computing device B before receiving the write request from computing device A. As such, the proposal record 90-2 has the write request of computing device B (e.g., the second transaction number) in the first priority position and the write request from computing device A in a second priority position. The remaining storage units generate their respective proposal records in a similar manner.

In general, a storage unit "opens" a proposal record when it receives a new write request for a version of an encoded data slice having a slice name (i.e., no other write requests are pending). The storage unit sends to proposal record to the computing device sending the write request. If there are no overlapping write requests for a set of encoded data slices having a set of slice names, then the other storage units (SU#2-SU#5) open up proposal records and send them to the computing device.

The computing device interprets the proposal records to determine whether a threshold number, or more, (e.g., decode threshold number, write threshold number, etc.) of its write requests is in the first priority position. When there is not an overlapping write request, the write requests will be in the first priority position. As such, the computing device sends finalize requests to the storage units. The storage units process the finalize request to make the new version of the encoded data slices as the most recent set of encoded data slices and close their respective proposal records.

When there is an overlapping write request (e.g., a storage unit has an open proposal record for the slice name), the storage unit updates the proposal record with the new write request by placing the new write request in a lower priority position than previously received and pending write requests. After updating the proposal record, the storage unit sends the proposal record to the computing device that sent the new write request.

As each computing devices receives the proposal record, it determines whether at least the threshold number of their respective write requests are in first priority position. If yes, the computing device issues the finalize commands. If not, the computing device withdraws its write requests or executes some other fallback position.

In addition to the two write requests, computing device C is sending read requests to the storage units for the set of encoded data slices 98. The storage units add the read requests to their respective proposal records and send the updated proposal records to computing device C. Upon receiving the proposal records, computing device C determines whether to proceed with the read request (e.g., read the current revision level of the set of encoded data slices) or terminate the read request. As an alternative, computing device C processes the proposal records to determine that the new set of encoded data slices from computing device A or computing device B will be the next current version of the set of encoded data slices. Having made this determination, computing device C modifies its read requests to read the next current version of the set of encoded data slices.

Figure 10:
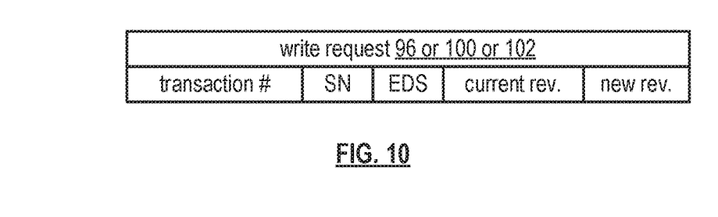
FIG. 10 is a schematic block diagram of an example of a write request for an encoded data slice in accordance with the present invention.

FIG. 10 is a schematic block diagram of an example of a write request 96 or 100 that of FIG. 9. The write request includes a transaction number field, a slice name (SN) field, an encoded data slice (EDS) field, a current revision level field, and a new revision level field. Each write request in the set of write requests includes the same transaction number, a different slice name, a different EDS, the same current revision level, and the same new revision level.

Figure 11:
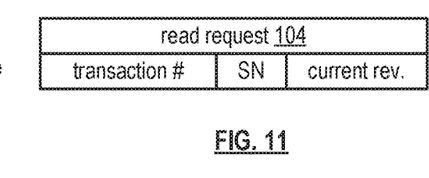
FIG. 11 is a schematic block diagram of an example of a read request for an encoded data slice in accordance with the present invention.

FIG. 11 is a schematic block diagram of an example of a read request 104 such as may be performed instead of or in conjunction with the write requests of FIG. 9. The read request includes a transaction number field, a slice name (SN) field, and a current revision level field. Each read request in the set of read requests 104 includes the same transaction number, a different slice name, and the same current revision level.

Figure 12:
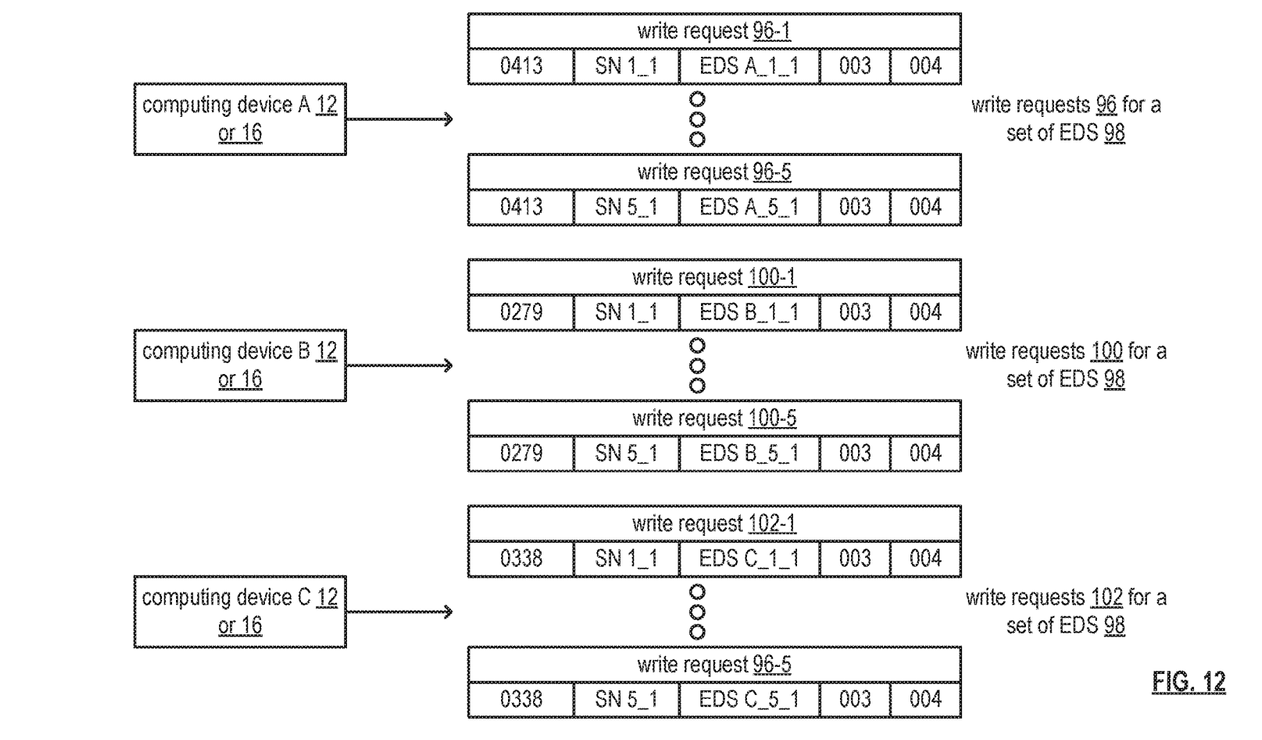
FIG. 12 is a schematic block diagram of another example of overlapping write requests and read requests for a set of encoded data slices in accordance with the present invention.

FIG. 12 is a schematic block diagram of another example of overlapping write requests 96, 100, and 102 for a set of encoded data slices 98. In this example, each of computing devices A and B encodes a data segment into a set of seven encoded data slices. Accordingly, each of computing devices A, B, and C generates seven write requests 96-1 through 96-5, and 100-1 through 100-5, and 102-1 through 102-5. The write requests from computing device A include the same transaction number of 0413 (which may be randomly generated, may be a time stamp, etc.), differing slice names (SN 1_1 through SN 5_1), differing encoded data slices (EDS A_1_1 through EDS A_5_1), the same current revision level of 003, and the next revision level of 004.

The write requests form computing device B include the same transaction number of 0279, differing slice names (SN 1_1 through SN 5_1), differing encoded data slices (EDS B_1_1 through EDS B_5_1), the same current revision level of 003, and the next revision level of 004. A comparison of the write requests from computing device A with the write requests from computing device B yields that the write requests have the same slice names, the same current revision levels, and the same next revision levels. The write requests differ in the transaction numbers and in the encoded data slices.

The write requests form computing device C include the same transaction number of 0338, differing slice names (SN 1_1 through SN 5_1), differing encoded data slices (EDS C_1_1 through EDS C_5_1), the same current revision level of 003, and the next revision level of 004. A comparison of the write requests from computing device A with the write requests from computing device B and the computing device C yields that these write requests also have the same slice names, the same current revision levels, and the same next revision levels. The write requests differ in the transaction numbers and in the encoded data slices.

The write requests are sent to the storage units SU#1 through SU#5, which processes the write requests as discussed with reference to FIG. 13.

Figure 13:
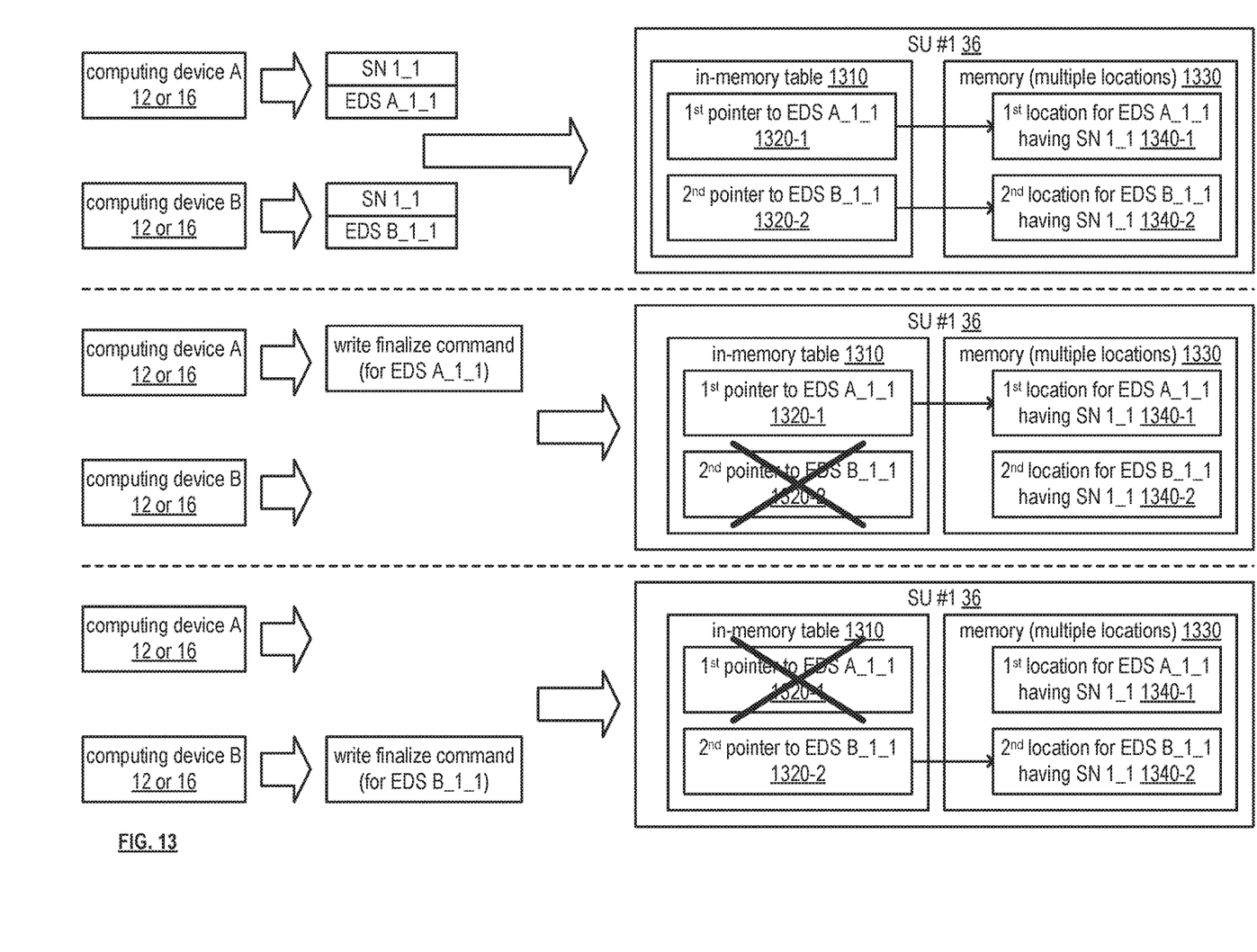
FIG. 13 is a schematic block diagram of an example of write operations made to a storage unit from two or more computing devices in accordance with the present invention.

FIG. 13 is a schematic block diagram of an example of write operations made to a storage unit from two or more computing devices in accordance with the present invention. Two different computing devices A and B send write requests to a storage unit. For example, the computing device A sends a first write request to storage unit #1 36 (e.g., that includes a first slice name SN_1_1, such as from a first set of slice names that includes SN 1_1 through SN 5_1, and a first encoded data slice EDS A_1_1, such as from a first set of encoded data slices generated by computing device A that includes EDS A_1_1 through EDS A_5_1 such as with reference to FIG. 12), and the computing device B also sends a first write request to the storage unit #1 36 (e.g., that includes a first slice name SN 1_1, such as from the first set of slice names that includes SN 1_1 through SN 5_1, and a second encoded data slice EDS B_1_1, such as from a second set of encoded data slices generated by computing device B that includes EDS B_1_1 through EDS B_5_1 such as with reference to FIG. 12).

As such, the storage unit #1 36 receives a first encoded data slice (e.g., first encoded data slice, EDS A_1_1 having slice name, SN 1_1) based on a first write request from computing device A. Then, the storage unit #1 36 stores the EDS A_1_1 having slice name, SN 1_1 within a first location 1340-1 within a memory 1330 of the storage unit #1 36. The memory 1330 includes multiple storage locations to store information therein including multiple encoded data slices. Then, the storage unit #1 36 updates an in-memory table within the storage unit #1 36 to include a first pointer to EDS A_1_1 1320-1 that points to the first location 1340-1 within the memory that stores the EDS A_1_1. The in-memory table is configured to maintain a listing of slice names regarding data slices stored in the memory 1330.

Also, the storage unit #1 36 receives a second encoded data slice (e.g., second encoded data slice, EDS B_1_1 having the same slice name, SN 1_1) based on a second write request from computing device B. Then, the storage unit #1 36 stores the EDS B_1_1 having the slice name, SN 1_1 within a second location 1340-2 within the memory 1330 of the storage unit #1 36. Then, the storage unit #1 36 updates the in-memory table within the storage unit #1 36 to include a second pointer to EDS B_1_1 1320-2 that points to the second location 1340-2 within the memory that stores the EDS B_1_1.

Then, after the first encoded data slice, EDS A_1_1 having slice name, SN 1_1, and the second encoded data slice, EDS B_1_1 having the same slice name, SN 1_1 have been stored in their respective locations in the memory and the in-memory table within the storage unit #1 36 has been updated to include the first and second pointers, 1320-1 and 1320-2, the storage unit #1 36 receives a write finalize command from the computing device A or the computing device B that specifies the first encoded data slice, EDS A_1_1, or the second encoded data slice, EDS B_1_1, to be preserved within the memory 1330 of the storage unit #1 36.

The storage unit #1 36 then updates the in-memory table within the storage unit #1 36 to preserve the respective pointer associated with the first encoded data slice, EDS A_1_1, or the second encoded data slice, EDS B_1_1, that is to be preserved within the memory 1330 based on the write finalize command from the computing device A or the computing device B.

For example, if a write finalize command is received from the computing device A, then the storage unit #1 36 updates the in-memory table within the storage unit #1 36 to preserve the first pointer to EDS A_1_1 1320-1 that points to the first location 1340-1 within the memory that stores the EDS A_1_1 and to delete and/or erase the second pointer to EDS B_1_1 1320-2 that points to the second location 1340-1 within the memory that stores the EDS B_1_1. Note that the actual information (e.g., the EDS B_1_1) need not be deleted, erased, and/or over-written. The deletion and/or erasure of the second pointer to EDS B_1_1 1320-2 effectively removes the EDS B_11 future memory accesses such that it will not be accessible going forward but the EDS A_1_1 will be.

Alternatively, if a write finalize command is received from the computing device B, then the storage unit #1 36 updates the in-memory table within the storage unit #1 36 to preserve the second pointer to EDS B_1_1 1320-2 that points to the second location 1340-1 within the memory that stores the EDS B_1_1 and to delete and/or erase the first pointer to EDS A_1_1 1320-1 that points to the first location 1340-1 within the memory that stores the EDS A_1_1. Note that the actual information (e.g., the EDS A_1_1) need not be deleted, erased, and/or over-written. The deletion and/or erasure of the second pointer to EDS A_1_1 1320-12 effectively removes the EDS A_1_1 from future memory accesses such that it will not be accessible going forward but the EDS B_1_1 will be.

Figure 14:
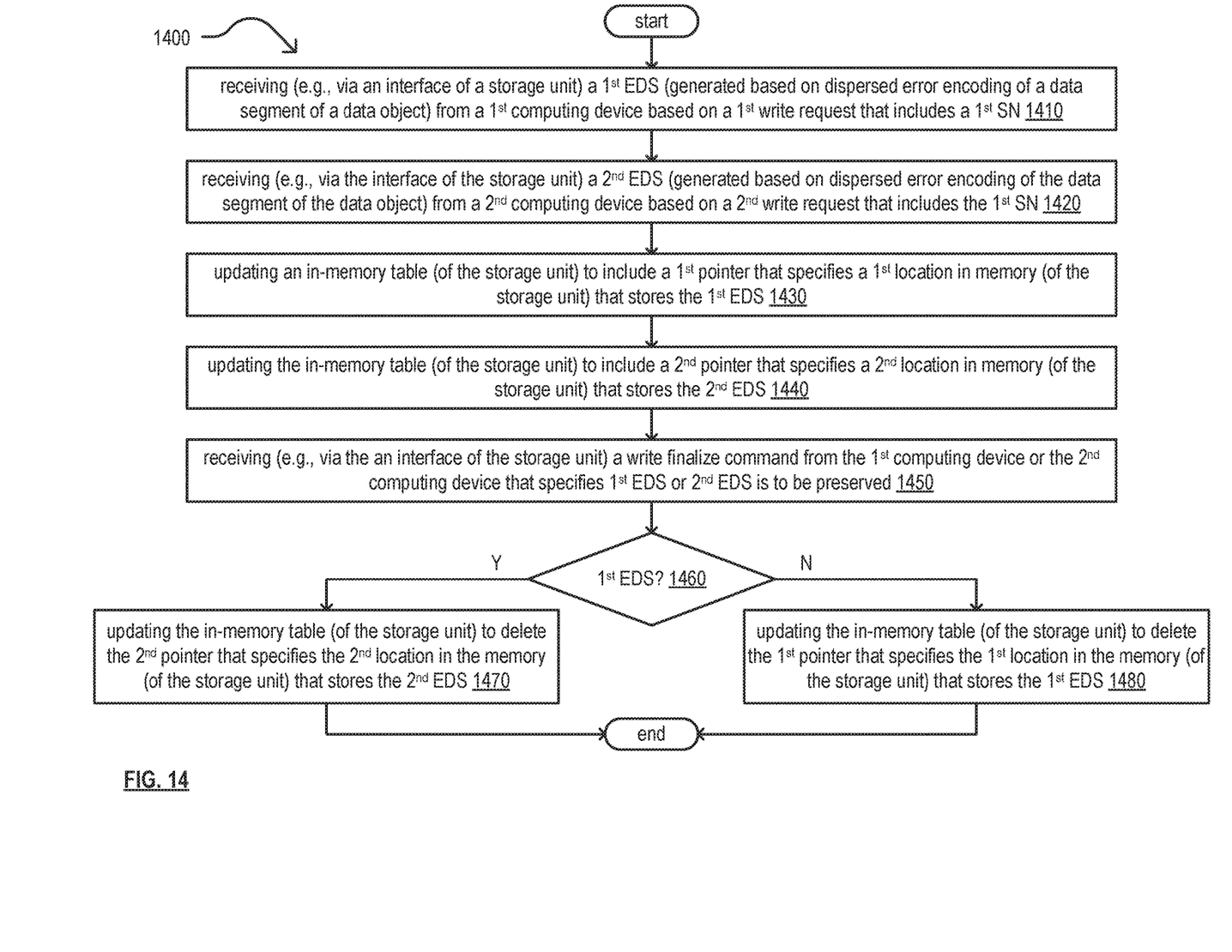
FIG. 14 is a logic diagram of another example of a method of processing that reduces memory device input/output (I/O) operations in accordance with the present invention.

FIG. 14 is a logic diagram of another example of a method 1400 of processing that reduces memory device input/output (I/O) operations in accordance with the present invention. The method 1400 begins by receiving (e.g., via an interface of a storage unit that is configured to interface with a dispersed storage network (DSN) and from a first computing device based on a first write request that includes a first slice name) a first encoded data slice having the first slice name and storing the first encoded data slice in a first location in a memory of the storage unit (block 1410). Note that a data segment of a data object is dispersed error encoded by the first computing device to produce a first set of encoded data slices that includes the first encoded data slice. Also, the memory of the storage unit is configured to store encoded data slices received from multiple computing devices within the DSN.

The method 1400 continues by receiving (e.g., via the interface of the storage unit and from a second computing device based on a second write request that includes the first slice name) a second encoded data slice having the first slice name and store the second encoded data slice in a second location in the memory of the storage unit (block 1420). Note that the data segment of the data object is also dispersed error encoded by the second computing device to produce a second set of encoded data slices that includes the second encoded data slice.

The method 1400 then operates by updating an in-memory table of the storage unit to include a first pointer that specifies the first location in the memory that stores the first encoded data slice (block 1430). This in-memory table of the storage unit configured to maintain a listing of slice names regarding data slices stored in the memory of the storage unit. The method 1400 then operates by updating the in-memory table of the storage unit to include a second pointer that specifies the second location in the memory of the storage unit that stores the second encoded data slice (block 1440).

The method 1400 then operates by receiving (e.g., via the interface of the storage unit and from the first computing device or the second computing device) a write finalize command that specifies the first encoded data slice or the second encoded data slice that is to be preserved (block 1450). As such, the other encoded data slice is not to be preserved.

The method 1400 then operates by determining whether the first encoded data slice or the second encoded data slice is to be preserved (block 1460). If the write finalize command refers to the $1^{st}$ encoded data slice, then the method 1400 branches and operates by updating the in-memory table of the storage unit to preserve the first pointer that specifies the first location in the memory that stores the first encoded data slice and to delete the second pointer that specifies the second location in the memory that stores the second encoded data slice (block 1470). Alternatively, if the write finalize command does not refer to the $1^{st}$ EDS (e.g., refers to the $1^{st}$ encoded data slice) and refers to the $2^{nd}$ encoded data slice, then the method 1400 branches and operates by updating the in-memory table of the storage unit to preserve the second pointer that specifies the second location in the memory that stores the second encoded data slice and to delete the first pointer that specifies the first location in the memory that stores the first encoded data slice (block 1480)

In some examples, the first computing device is located at a first premises that is remotely located from the storage unit within the DSN, and the second computing device is located at a second premises that is remotely located from the storage unit and also remotely located from the first computing device within the DSN. Note also that data object is accessible by the first computing device via the DSN and also by the second computing device via the DSN.

In other examples, the method 1400 also operates by retaining both the first encoded data slice in the first location in the memory and the second encoded data slice in the second location in the memory when the in-memory table is updated to preserve one particular pointer (e.g., first pointer) based on the write finalize command when the other pointer (e.g., second pointer) is deleted.

In addition, the method 1400 can operate by retaining the first encoded data slice in the first location in the memory and overwriting the second encoded data slice in the second location in the memory by another encoded data slice that is received via the interface from the first computing device or the second computing device when the first encoded data slice in the first location in the memory is to be preserved and the second encoded data slice in the second location in the memory is not to be preserved.

In even other examples, when the first encoded data slice in the first location in the memory is to be preserved and the second encoded data slice in the second location in the memory is not to be preserved, the method 1400 may operate by retaining the first encoded data slice in the first location in the memory and the second encoded data slice in the second location in the memory at or during a first time. The method 1400 then may operate by receiving, via the interface of the storage unit, another encoded data slice from the first computing device or the second computing device at or during a second time that is after the first time and then overwriting the second encoded data slice in the second location in the memory by the another encoded data slice at or during a third time that is after the second time.

Note that the storage unit as described in many of the examples herein may be one storage unit of a set of storage units located within the DSN. Note also that the first computing device and/or the second computing device may include any type of devices including a wireless smart phone, a laptop, a tablet, a personal computers (PC), a work station, and/or a video game device.

As can be seen, a single memory device operation can be performed as described herein such that slice data may be written into memory of a storage unit, but that slice data need not be modified in the memory (e.g., on-disk) in finalize and/or cleanup phases. For example, the visibility of the slice data can be controlled via modifications to this in-memory table structure (e.g., based on the modifications of the pointers to the actual slice data within the memory). Hence, during subsequent phases of a write process (e.g., commit and cleanup phases), only the in-memory table structure is modified, while the on-memory-device slice data is not changed. In some examples, the actual data would only get modified when it is over-written by other slice data that is subsequently received.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A storage unit comprising:
    an interface configured to interface with a dispersed storage network (DSN);
    a memory configured to store encoded data slices received from a plurality of computing devices within the DSN;
    an in-memory table configured to maintain a listing of slice names regarding data slices stored in the memory;
    a processing module operably coupled to the interface, the memory, and the in-memory table, wherein the processing module is configured to:
        receive, via the interface and from a first computing device based on a first write request that includes a first slice name, a first encoded data slice having the first slice name and store the first encoded data slice in a first location in the memory, wherein a data segment of a data object is dispersed error encoded by the first computing device to produce a first set of encoded data slices that includes the first encoded data slice;
        receive, via the interface and from a second computing device based on an overlapping second write request that includes the first slice name, a second encoded data slice having the first slice name and store the second encoded data slice in a second location in the memory, wherein the data segment of the data object is dispersed error encoded by the second computing device to produce a second set of encoded data slices that includes the second encoded data slice, wherein the first computing device is located at a first premises that is remotely located from the storage unit within the DSN and the second computing device is located at a second premises that is remotely located from the storage unit and also remotely located from the first computing device within the DSN, and wherein the overlapping second write request includes the first computing device and the second computing device each attempting to write to a same storage unit using the same first slice name during an overlapping time period, where the overlapping time period occurs when the first write request is pending while the second write request is received by the same storage unit;
        assign a first priority position or a second priority position to the first write request and the overlapping second write request based on a time ordered listing of transactions;
        update the in-memory table to include a first pointer that specifies the first location in the memory that stores the first encoded data slice;
        update the in-memory table to include a second pointer that specifies the second location in the memory that stores the second encoded data slice;
        receive, via the interface, a write finalize command from the first computing device or the second computing device based on one of the computing devices reaching a write threshold of first priority positions for the set of encoded data slices, wherein the first priority position specifies one of the first encoded data slice and the second encoded data slice that is to be preserved; and
        update the in-memory table to preserve one of the first pointer or the second pointer based on the write finalize command and delete another one of the first pointer or the second pointer.

2. The storage unit of claim 1, wherein the data object is accessible by the first computing device via the DSN and also by the second computing device via the DSN.

3. The storage unit of claim 1, wherein the processing module is further configured to:
    retain both the first encoded data slice in the first location in the memory and the second encoded data slice in the second location in the memory when the in-memory table is updated to preserve the one of the first pointer or the second pointer based on the write finalize command and when the another one of the first pointer or the second pointer is deleted.

4. The storage unit of claim 1, wherein the processing module is further configured to:
    when the first encoded data slice in the first location in the memory is to be preserved and the second encoded data slice in the second location in the memory is not to be preserved, retain the first encoded data slice in the first location in the memory and overwrite the second encoded data slice in the second location in the memory by another encoded data slice that is received via the interface from the first computing device or the second computing device.

5. The storage unit of claim 1, wherein the processing module is further configured to:
    when the first encoded data slice in the first location in the memory is to be preserved and the second encoded data slice in the second location in the memory is not to be preserved, retain the first encoded data slice in the first location in the memory and the second encoded data slice in the second location in the memory at or during a first time;
    receive, via the interface, another encoded data slice from the first computing device or the second computing device at or during a second time that is after the first time; and
    overwrite the second encoded data slice in the second location in the memory by the another encoded data slice at or during a third time that is after the second time.

6. The storage unit of claim 1, wherein the storage unit is one storage unit of a plurality of storage units located within the DSN, and wherein at least one of the first computing device or the second computing device includes a wireless smart phone, a laptop, a tablet, a personal computers (PC), a work station, or a video game device.

7. The storage unit of claim 1, wherein the DSN includes at least one of a wireless communication system, a wire lined communication systems, a non-public intranet system, a public internet system, a local area network (LAN), or a wide area network (WAN).

8. A method for execution by a storage unit, the method comprising:
    receiving, via an interface of the storage unit that is configured to interface with a dispersed storage network (DSN) and from a first computing device based on a first write request that includes a first slice name, a first encoded data slice having the first slice name and storing the first encoded data slice in a first location in a memory of the storage unit, wherein a data segment of a data object is dispersed error encoded by the first computing device to produce a first set of encoded data slices that includes the first encoded data slice, wherein the memory of the storage unit is configured to store encoded data slices received from a plurality of computing devices within the DSN;

receiving, via the interface of the storage unit and from a second computing device based on an overlapping second write request that includes the first slice name, a second encoded data slice having the first slice name and storing the second encoded data slice in a second location in the memory of the storage unit, wherein the data segment of the data object is dispersed error encoded by the second computing device to produce a second set of encoded data slices that includes the second encoded data slice, wherein the first computing device is located at a first premises that is remotely located from the storage unit within the DSN and the second computing device is located at a second premises that is remotely located from the storage unit and also remotely located from the first computing device within the DSN, and wherein the overlapping second write request includes the first computing device and the second computing device each attempting to write to a same storage unit using the same first slice name during an overlapping time period, where the overlapping time period occurs when the first write request is pending while the second write request is received by the same storage unit;

updating an in-memory table of the storage unit to include a first pointer that specifies the first location in the memory that stores the first encoded data slice, wherein the in-memory table of the storage unit configured to maintain a listing of slice names regarding data slices stored in the memory of the storage unit;

updating the in-memory table of the storage unit to include a second pointer that specifies the second location in the memory of the storage unit that stores the second encoded data slice;

assigning a first priority position or a second priority position to the first write request and the overlapping second write request based on a time ordered listing of transactions;

receiving, via the interface of the storage unit and from the first computing device or the second computing device, a write finalize command from the first computing device or the second computing device based on one of the computing devices reaching a write threshold of first priority positions for the set of encoded data slices, wherein the first priority position specifies one of the first encoded data slice and the second encoded data slice that is to be preserved; and updating the in-memory table of the storage unit to preserve one of the first pointer or the second pointer based on the write finalize command and delete another one of the first pointer or the second pointer.

9. The method of claim 8, wherein the data object being accessible by the first computing device via the DSN and also by the second computing device via the DSN.

10. The method of claim 8 further comprising:
retaining both the first encoded data slice in the first location in the memory and the second encoded data slice in the second location in the memory when the in-memory table is updated to preserve the one of the first pointer or the second pointer based on the write finalize command and when the another one of the first pointer or the second pointer is deleted.

11. The method of claim 8 further comprising:
when the first encoded data slice in the first location in the memory is to be preserved and the second encoded data slice in the second location in the memory is not to be preserved, retaining the first encoded data slice in the first location in the memory and overwriting the second encoded data slice in the second location in the memory by another encoded data slice that is received via the interface from the first computing device or the second computing device.

12. The method of claim 8 further comprising:
when the first encoded data slice in the first location in the memory is to be preserved and the second encoded data slice in the second location in the memory is not to be preserved, retaining the first encoded data slice in the first location in the memory and the second encoded data slice in the second location in the memory at or during a first time;
receiving, via the interface of the storage unit, another encoded data slice from the first computing device or the second computing device at or during a second time that is after the first time; and
overwriting the second encoded data slice in the second location in the memory by the another encoded data slice at or during a third time that is after the second time.

13. The method of claim 8, wherein the storage unit is one storage unit of a plurality of storage units located within the DSN, and wherein at least one of the first computing device or the second computing device includes a wireless smart phone, a laptop, a tablet, a personal computers (PC), a work station, or a video game device.

14. The method of claim 8, wherein the DSN includes at least one of a wireless communication system, a wire lined communication systems, a non-public intranet system, a public internet system, a local area network (LAN), or a wide area network (WAN).

* * * * *